April 12, 1927.

S. F. REBORA 1,624,182

TOASTER

Filed April 20, 1925

Inventor
Stephen F. Rebora,
by Wm. F. Freudenreich
Atty.

Patented Apr. 12, 1927.

1,624,182

UNITED STATES PATENT OFFICE.

STEPHEN F. REBORA, OF CHICAGO, ILLINOIS.

TOASTER.

Application filed April 20, 1925. Serial No. 24,383.

The present invention has for its object to produce a simple and novel device, and one which in its simpler forms may be very cheaply manufactured, for successfully toasting a plurality of slices of bread or the like.

Figure 1:
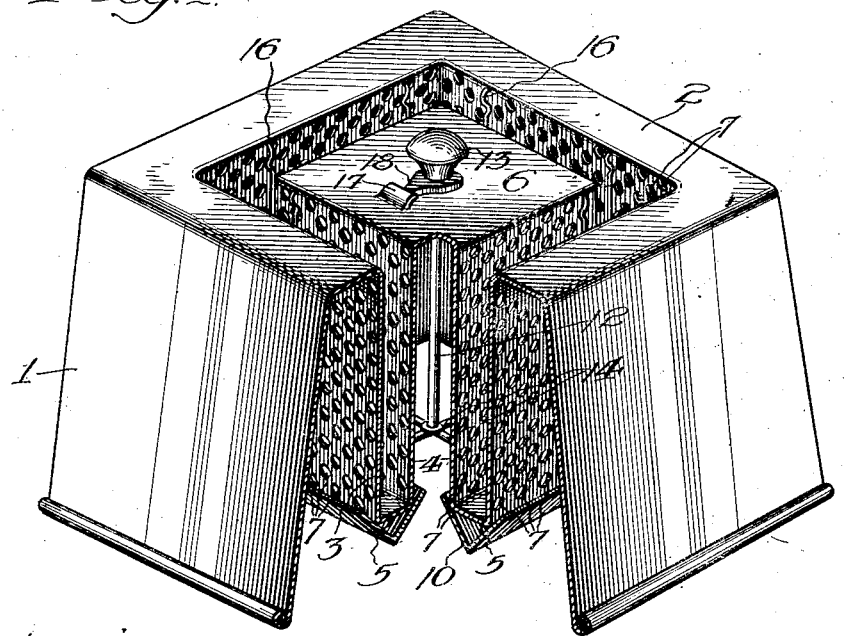
Figure 2:
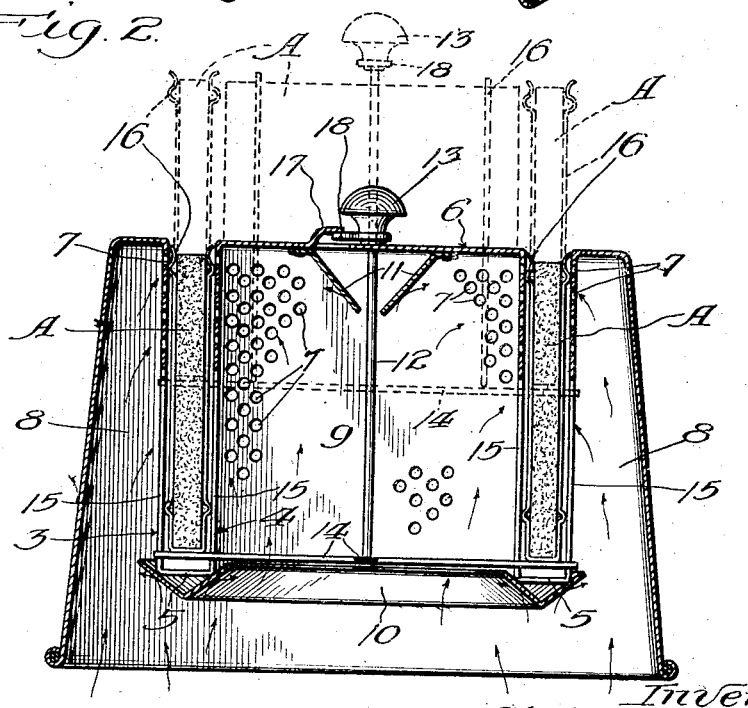

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a perspective view of a device embodying my invention in one of its forms, portions being broken away to expose the interior construction; and Fig. 2 is a vertical central section through the device filled with bread to be toasted, the dotted lines showing the lifter for the bread in its elevated position.

In the drawing I have illustrated only a single simple form of my invention and, for the sake of brevity, I shall confine the detailed description to this particular form, although it will be understood that the principle of my invention may be embodied in many different forms.

Referring to the drawing, 1 represents a square casing in the form of a deep inverted pan. The bottom wall 2 of the pan is depressed so as to form a deep narrow endless trough which is, however, somewhat shallower than the height of the side walls of the casing. The trough consists of two parallel side walls 3 and 4 and a bottom 5. The outer walls 3 of the several trough sections are spaced apart from the sides of the casing, while the upper edges of the inner walls 4 are connected by the central portion 6 of the top of the casing. Consequently there is a free space surrounding the depending trough while the space that is surrounded by the trough forms a chamber closed at the top and open at the bottom. The sides of the trough are filled with many perforations 7.

The parts are so proportioned that each of the four sections or wings of the endless trough is adapted to hold a slice of bread or other thing to be toasted. Assuming that slices of bread, as indicated at A, A in Fig. 2, are placed in the toaster and that the same is then set over a source of heat, such as an electric heating unit, a gas or oil burner, or an opening in the top of a coal stove, it will be seen that the hot air and gases will rise upwardly into the endless space 8 surrounding the trough and into the chamber 9. The outlet for these hot fluids is through the perforations 7. Therefore, assuming the arrows in Fig. 2 to show the flow of these hot fluids, it will be seen that the latter will be brought into intimate contact with and flow over both broad faces of each of the pieces of bread that is to be toasted. Consequently four pieces of bread may be toasted simultaneously and on both sides without removing them or shifting them in any way.

If desired, a suitable baffle 10 may be arranged underneath the bottom of the trough, or elsewhere, to control the upper flow of the hot gases. Similarly, baffles 11 may be placed in the top of the chamber 9, to direct laterally the flow of the gases rising in the center of this chamber.

If desired, the device may be provided with a suitable holder and lifter, to permit the toast to be readily removed from the device. In the arrangement shown, there is a central vertical rod 12 projecting through the top wall 6 and provided with a suitable handle 13. At the lower end of the rod is fixed a horizontal spider shown as consisting of two cross arms at right angles to each other. These arms extend through slots 15 in the walls of the trough and there support U-shaped clips 16 of wire or other suitable material. When the rod is raised as shown in dotted lines in Fig. 2, the upper portion of the toast is carried above the top of the toaster and may readily be grasped and removed. On top of the walls 6 is an L-shaped lug 17 underneath which a finger 18, fixed to the handle or knot 13, which is loose on the rod, may be brought into a predetermined angular position by turning the handle or knob; thus locking the rod to the toaster and permitting the knob or handle 13 to be used for the purpose of carrying the device, including the toast, from one place to another.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A toasting device comprising a shell open at the bottom, the top of the shell being depressed to form a deep endless trough opening upwardly and spaced apart from the sides of the shell, and the side walls of said trough being perforated.

2. A toasting device comprising a shell open at the bottom, the top of the shell having therein deep depressions spaced at some distance inwardly from the sides of the shell and each adapted to receive and hold on edge a piece of bread to be toasted, the side walls of said depressions being perforated.

3. A toasting device comprising a casing closed at the top and having in said top deep depressions spaced at some distance inwardly from the sides of the shell and each adapted to receive and hold on edge a piece of bread to be toasted, the side walls of the depressions being perforated.

4. A toasting device comprising a casing closed at the top, the top wall of said casing being depressed to form a deep narrow trough the side walls of which are spaced apart from the corresponding walls of the casing, said side walls of the trough being perforated.

5. A toasting device comprising a shell having its top depressed to form a deep narrow endless trough, the side walls of the trough being perforated, a lifter mounted so as to be vertically movable relatively to the shell, clips on the lifter lying in said trough, and means for locking the lifter against vertical movement relative to the shell.

In testimony whereof, I sign this specification.

STEPHEN F. REBORA.